Patented Nov. 14, 1939

2,180,152

UNITED STATES PATENT OFFICE 2,180,152

ADHESIVE

Rüdolf Köhler, Dusseldorf, Germany, assignor to Henkel & Cie., G. m. b. H., Dusseldorf-Holthausen, Germany, a corporation of Germany No Drawing. Application November 7, 1936, Serial No. 109,753. In Germany December 14, 1935

4 Claims. (Cl. 134—23.5)

This invention relates to a new class of adhesive compounds having a cellulosic base as distinguished from a starch base, suitable when in dilute aqueous colloidal solution for the hanging of wall paper, for pasting or cementing paper products as in the production of paper cartons, and in bookbinding. They are also suitable for the priming of interior walls, particularly when coloring matter is desired in the prime coat.

More particularly, the invention relates to cellulosic base adhesives which may be referred to broadly as water soluble salts of cellulose ether carboxylic acids and to methods of producing and applying the same.

Ethers produced from cellulose and halocarboxylic acids such as monochloracetic acid have been known for some years, but up to the time of the instant invention no one has discovered that colloidal solutions of the water soluble salts thereof are excellently adapted for certain cementing and pasting purposes.

The objects of the present invention are to provide a new class of adhesives which are low in cost, economical in use, stable against deterioration, strong in cementing power, marketable in the form of powder and readily put in condition for use by dissolving in water.

The preferred compounds within the scope of the present invention comprise the sodium salts of ethers of cellulose with alkyl carboxylic acids, specially with lower molecular acids. Other suitable water soluble salts of the cellulose ether carboxylic acids are the potassium, ammonium, triethanol amine and triethyl ammonium salts.

In accordance with the preferred method of producing the adhesives of the present invention, natural cellulose, regenerated cellulose or modified cellulose is reacted with a halo derivative of an alkyl carboxylic acid, for example, chloracetic acid, chlorpropionic acid, chlorbutyric acid, beta-chlorethoxy acetic acid and the like, preferably in the presence of alkaline condensing agents. The resulting products comprise water soluble salts of cellulose ether carboxylic acids. They are then dried to reduce the same to a concentrated form such as to a powder or a paste.

Other methods of producing the salts may also be used, for example, by reacting already formed sodium cellulose, potassium cellulose, cupric cellulose and the like with halogen alkyl carboxylic acids, or by neutralizing the cellulose ether carboxylic acid with a suitable base.

The resulting adhesive product is made ready for use by dissolving the same in water to form a dilute solution which sets into a colloidal highly viscous mass. The most suitable concentration for hanging wall paper, a use to which the adhesive is excellently suited, is from 3 to 5%. Other uses require a somewhat greater concentration, seldom however larger than 8%.

Since the herein described adhesive products dissolve and swell readily in cold water, the present invention contemplates the production of the same in powder or granular form and marketing them in this form. It is a simple matter for the user to prepare the adhesive in condition for application by merely dissolving in cold water. Alternatively, the adhesive product may be prepared and marketed in the form of a paste of from 8 to 5% strength, which paste may be diluted by the user to an extent which suits his particular purpose.

The adhesives of the present invention excel in their ability to take up water and hence are superior in efficiency to adhesives now on the market, especially those used for hanging wall paper. Another outstanding property of the instant adhesives is stability against the action of micro-organisms, which property makes unnecessary the addition of any preserving agent.

In accordance with a special embodiment of the present invention, an adhesive composition of merit for certain purposes is prepared by mixing starch paste with the adhesives hereinbefore described, in any desired proportions, for example, with 50% of starch paste. Additional adhesive compositions of value can also be obtained by mixing other conventional pastes with the adhesives of the present invention and such mixtures are considered within the scope of the invention herein claimed.

The following examples illustrate several embodiments of the invention, the parts described therein being by weight.

*Example 1*

One hundred and ninety parts of monochloracetic acid are reacted with 162 parts of cellulose in the presence of sodium hydroxide in known manner. Through this reaction, the sodium salt of the ether of cellulose with glycolic acid is obtained. This product is then reduced to a powdered form by conventional procedure.

One part of this powdered product is dissolved in 20 parts of water at normal temperatures with the aid of stirring. The resultant mixture comprises a thick strongly adhesive paste which can be used without further treatment, for example, as a bookbinding paste or as a foundation adhesive in applying the backs to books or in the production of paper bags. If desired, a filler such as chalk, for example, may be incorporated in these adhesives in suitable proportions.

*Example 2*

The sodium salt of the cellulose ether glycolic acid in powdered form prepared in accordance with the procedure of Example 1 is mixed with a 20% aqueous solution of alcohol and thereafter dried, thereby converting the salt into a coarser form. One part of this product is dissolved in 30 parts of water with the aid of stirring, thereby readily producing a solution which does not contain any lumps. The colloidal solution obtained in this manner has the consistency of the ordinary wall paper paste and is ready for use for the hanging of wall paper several minutes after its preparation.

*Example 3*

A mixture of 50 parts of treated or swelling starch, prepared in known manner, is mixed with 50 parts of the sodium salt of the cellulose ether glycolic acid prepared in accordance with the procedure of Example 2. One part of this mixture is dissolved with the aid of stirring in 13 parts of water. The solution formed possesses excellent properties when used as a painter's size.

It should be understood that the present invention is not limited to the specific compounds herein mentioned but that it extends to all compounds which one skilled in the art would consider within the scope of the appended claims.

I claim:

1. A gelatinous adhesive for wall paper hanging composed of a viscous aqueous colloidal solution of from 3% to 8% concentration of a water-soluble salt of an ether of cellulose with a lower molecular carboxylic acid, said colloidal mass after application not requiring further treatment for obtaining adhesive properties.

2. A gelatinous adhesive for wall paper hanging composed of a viscous aqueous colloidal solution of 3% to 8% concentration of a sodium salt of an ether of cellulose with glycolic acid said colloidal mass after application not requiring further treatment for obtaining adhesive properties.

3. A gelatinous adhesive for wall paper hanging composed of a viscous aqueous colloidal solution of a water-soluble salt of an ether of cellulose with a lower molecular carboxylic acid together with a soluble starch, said salt being present in a quantity in proportion to the water present amounting to from 3% to 8%, and said colloidal mass after application not requiring further treatment for obtaining adhesive properties.

4. A gelatinous adhesive for wall paper hanging composed of a viscous aqueous colloidal solution of a water-soluble salt of an ether of cellulose with glycolic acid in combination with a soluble starch, said salt being present in a quantity in proportion to the water present amounting to from 3% to 8%, and said colloidal mass after application not requiring further treatment for obtaining adhesive properties.

RUDOLF KÖHLER.